(12) United States Patent
Van Gerwen et al.

(10) Patent No.: US 12,108,769 B2
(45) Date of Patent: Oct. 8, 2024

(54) DE-AERATION CAVITIES IN A MOULD MEMBER

(71) Applicant: GEA FOOD SOLUTIONS BAKEL B.V., Bakel (NL)

(72) Inventors: Hendrikus Petrus Gerardus Van Gerwen, Someren (NL); Andreas Leonardus De Bijl, La Den Dungen (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 912 days.

(21) Appl. No.: 16/603,462

(22) PCT Filed: Apr. 19, 2018

(86) PCT No.: PCT/EP2018/060071
§ 371 (c)(1),
(2) Date: Oct. 7, 2019

(87) PCT Pub. No.: WO2018/193046
PCT Pub. Date: Oct. 25, 2018

(65) Prior Publication Data
US 2020/0037621 A1      Feb. 6, 2020

(30) Foreign Application Priority Data

Apr. 19, 2017    (EP) .................................... 17167078

(51) Int. Cl.
*A22C 7/00*      (2006.01)
*A23P 30/10*     (2016.01)
(Continued)

(52) U.S. Cl.
CPC .......... *A22C 7/0069* (2013.01); *A22C 7/0076* (2013.01); *A23P 30/10* (2016.08);
(Continued)

(58) Field of Classification Search
CPC ............................. A22C 7/0069; A23P 30/10
See application file for complete search history.

(56) References Cited

U.S. PATENT DOCUMENTS

| | | | |
|---|---|---|---|
| 7,976,303 B2 * | 7/2011 | van der Eerden ... | A22C 7/0092 425/363 |
| 8,371,836 B2 * | 2/2013 | van der Eerden ... | A22C 7/0069 425/365 |

(Continued)

FOREIGN PATENT DOCUMENTS

| | | | | |
|---|---|---|---|---|
| WO | WO-2004002229 A2 * | 1/2004 | .......... | A22C 7/0069 |
| WO | WO-2010110655 A1 * | 9/2010 | ............. | A22C 7/003 |

(Continued)

OTHER PUBLICATIONS

International Search Report and Written Opinion for International Application No. PCT/E P2018/060071; mailed on Jul. 10, 2018.

(Continued)

*Primary Examiner* — Seyed Masoud Malekzadeh
(74) *Attorney, Agent, or Firm* — The Dobrusin Law Firm, P.C.

(57) ABSTRACT

The present invention relates to a food product forming apparatus with a food forming member, which comprises a multitude of product cavities and a seal plate which sealingly cooperates with the surface of the mould drum.

11 Claims, 6 Drawing Sheets

(51) Int. Cl.
    *B29C 37/00*           (2006.01)
    *B29C 43/40*           (2006.01)
    *B29C 45/27*           (2006.01)

(52) U.S. Cl.
    CPC .......... *B29C 37/0003* (2013.01); *B29C 43/40* (2013.01); *B29C 45/2725* (2013.01)

(56) References Cited

U.S. PATENT DOCUMENTS

| | | | |
|---|---|---|---|
| 8,770,962 B2 * | 7/2014 | van der Eerden | A23G 1/28 425/239 |
| 9,028,239 B2 * | 5/2015 | Van Gerwen | A22C 7/0069 425/197 |
| 9,380,790 B2 | 7/2016 | Van Gerwen | A23L 13/00 |
| 9,474,286 B2 * | 10/2016 | Van Der Eerden | A23P 30/10 |
| 9,533,784 B2 * | 1/2017 | Van Gerwen | B65B 1/366 |
| 9,554,593 B2 | 1/2017 | Righolt | A22C 7/0069 |
| 9,861,108 B2 * | 1/2018 | Van Gerwen | A22C 7/0069 |
| 9,949,493 B2 * | 4/2018 | Van Gerwen | A23L 13/00 |
| 10,537,114 B2 * | 1/2020 | Van Gerwen | A22C 7/0069 |
| 10,681,919 B2 * | 6/2020 | Van Gerwen | B65B 35/00 |
| 10,905,131 B2 * | 2/2021 | Van Der Eerden | A23P 30/10 |
| 11,166,470 B2 * | 11/2021 | Van Gerwen | A23P 30/10 |
| 11,395,499 B2 * | 7/2022 | Van Gerwen | A22C 7/0069 |
| 11,406,108 B1 * | 8/2022 | Alatorre | A21C 11/10 |
| 11,412,773 B2 * | 8/2022 | Van Gerwen | A22C 7/0069 |
| 2005/0220932 A1 * | 10/2005 | van der Eerden | A23P 30/10 426/1 |
| 2012/0058213 A1 * | 3/2012 | Lindee | A22C 7/0038 425/135 |
| 2013/0209598 A1 * | 8/2013 | Van Der Eerden | A23P 30/10 425/241 |
| 2013/0291483 A1 * | 11/2013 | Van Gerwen | B65B 65/003 53/113 |
| 2014/0199423 A1 * | 7/2014 | Righolt | A22C 7/0092 425/149 |
| 2014/0295018 A1 * | 10/2014 | Van Der Eerden | A23P 30/10 425/374 |
| 2014/0342072 A1 * | 11/2014 | Van Gerwen | F04C 13/00 425/239 |
| 2016/0302470 A1 * | 10/2016 | Van Gerwen | A23P 30/10 |
| 2017/0035067 A1 * | 2/2017 | Van Der Eerden | A23P 30/10 |
| 2018/0110375 A1 * | 4/2018 | Hansen | A21C 11/008 |

FOREIGN PATENT DOCUMENTS

| | | | | |
|---|---|---|---|---|
| WO | 2011/131372 A2 | 10/2011 | | |
| WO | 2012/012581 | 1/2012 | | |
| WO | WO-2012012581 A1 * | 1/2012 | ........... | A22C 7/0038 |
| WO | WO-2013014010 A1 * | 1/2013 | ............... | A22C 7/00 |
| WO | 2015/082254 | 6/2015 | | |
| WO | WO-2015082254 A1 * | 6/2015 | ............... | A22C 7/00 |

OTHER PUBLICATIONS

International Preliminary Report on Patentability for International Application No. PCT/E P2018/060071; mailed on Jul. 9, 2019.

\* cited by examiner

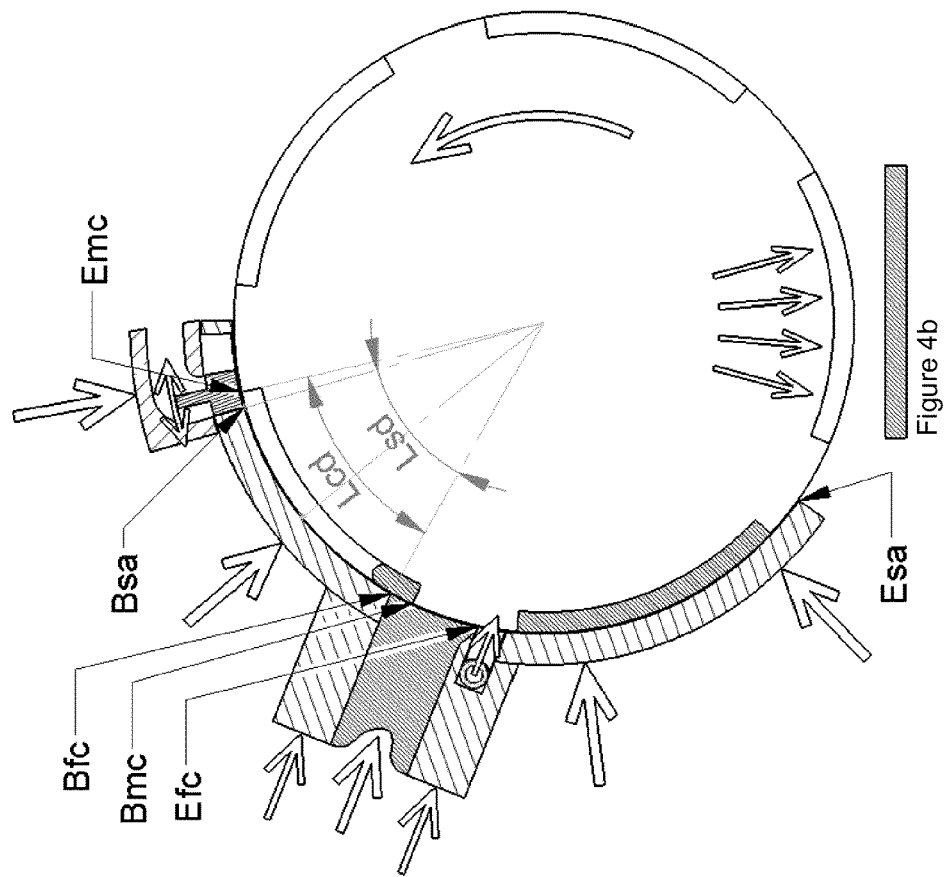
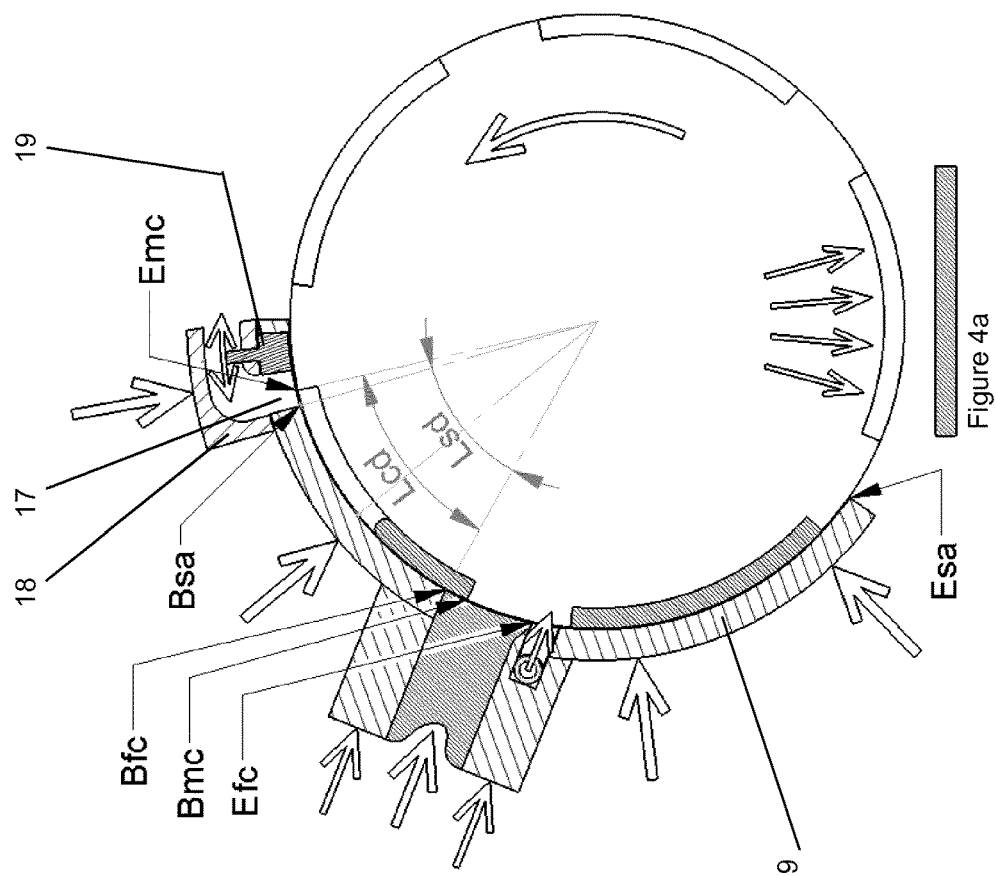

DE-AERATION CAVITIES IN A MOULD MEMBER

The present invention relates to a food product forming apparatus with a food forming member, which comprises a multitude of product cavities and a seal plate which sealingly cooperates with the surface of the mould drum.

During filling of such cavities with a food mass such as meat, vegetables and/or fish, entrapped air must be vented. In case the cavity is at least partially made from porous material, this can be done via the porous material. In certain cases, the de-aeration of air via the porous structure of the product cavity is not sufficient.

It was therefore the problem of the present invention to overcome the deficiencies of the state in the art.

The problem is attained with a food product forming apparatus with a food mould drum, which comprises a multitude of product cavities and a seal member which sealingly cooperates with the surface of the mould drum, wherein the seal plate comprises a venting means.

The present invention relates to a food forming apparatus, which forms a food mass such as minced meat, meat pieces or meat filets or the like into a certain shape like a patty. The apparatus comprises a mould drum, in which the food mass is formed. After forming, the formed product is removed from the cavity and the cavity can be refilled. The cavity can be made totally or partially form a porous material, for example a sintered material, such as plastic or metal. Via this porous material, the formed products can be ejected with a gas and/or the during filling the cavities can be vented via the porous material.

The mould member is a mould drum This food forming drum has at its outer surface a multitude of product cavities, which are open towards the circumference of the drum and in which the food mass is formed into a food product, for example a patty. This food forming drum preferably comprises a multitude of rows of product cavities, whereas each row comprises one or a multitude of product cavities, side by side. The rows are arranged in parallel to the middle axis of the inventive drum. During production, the drum turns continuously or intermittently and in one position the product cavities in one row are filled with the food mass and in a downstream position, the formed food mass is discharged from the product cavities, located in one row. Subsequently, the product cavities in one row of cavities can be filled again and so on. In order to vent the product cavities before and/or during and/or after their filling and/or in order to support the discharge of the product, the product cavities can be at least partially made of a porous material, for example sintered metal or plastic, which is gas-permeable and via which the product cavity can be vented or through which gas, for example air, can be discharged, to loosen the formed product from the surface of the product cavity. Preferably, the porous material comprises pores/channels, which are interconnected to each other. The food forming drum further preferably comprises fluid channels, which extend in the longitudinal direction of the drum, i.e. parallel to the center axis of the drum and extend preferably from one end to the other end of the drum. Via each fluid channel, ventilation air can be discharged, for example to the ambient, and/or compressed gas can be forced into the cavities to discharge the formed product. Additionally, a cleaning fluid can be forced through the channels and/or the porous material of the product cavities.

Before, during and/or after filling the cavity with food mass the cavity will be enclosed with seal member, for instance a seal plate, such that no undesirable leakage of mass occurs. This sealing member sealingly cooperates with the surface of the mould member, for example with the outer circumference of the mould drum. The seal member is preferably a seal plate whose length preferably extends over the entire axial length of the drum. Radially, the seal plate preferably covers the radial length of one cavity. However more preferably, it is longer than the radial length of the cavity in one row. Preferably, the seal plate comprises an opening, preferably a slot, that preferably extends over the entire axial length of the drum. Via this opening, the mould cavities are filled with the food mass. Preferably, the seal member is flexible so that it can compensate irregularities at the surface of the drum and/or so that a gap between the seal member and the surface of the mould member can be established, preferably due to the pressure of the gas to be vented. More preferably the seal member is pressed, at least locally, against the surface of the mould member.

According to the present invention, the seal member comprises venting means. These venting means are utilized to vent the cavities before and/or during and/or after filling. Preferably the venting takes place only during a desired period of time and/or in a desired amount. Via the venting means no or only as little as possible food product should escape out of the cavity. Preferably only gas can pass the venting means.

According to one embodiment of the present invention, the venting means is a valve. The valve can be a passage that extends through the entire thickness of the seal member from the surface that is in touch with the mould member to a surface that is, for example in connection to the ambient. There can be one valve per cavity in one row. The valve can be actuatable, manually and/or automatically. The valves in one row can be set differently. The valves are preferably provided in the vicinity of the upstream end of the seal member or upstream from the filling opening, e.g. the filing slot.

According to a preferred embodiment of the present the venting means is a gap between the mould drum and the seal plate. Preferably, this gap only exists temporarily, before, while or after the cavity or cavities in one row a being filled and/or have already been filled. The gap can occur due to the filling pressure in the cavity during and/or after filling. There can also be additionally or substitutionally mechanical or electrical means which create the gap between the seal member and the surface of the mould member. The gap can for example be provided by releasing the pressure by which the seal member is pressed against the surface of the mould member. The gap is preferably provided only locally, more preferably at the upstream end of each cavity relative to its movement after filling. However, the gap can also extend along the entire axial length of the seal member. Once the cavity is vented, the gap is preferably closed, for example by increasing the pressure on the seal member.

Preferably, the food product forming apparatus comprises a pressure member, preferably one or more piston/cylinder (s), which each presses the seal member against the mould drum and control means which control the pressure member to influence the size of the gap. In case there are more than one pressure member, the members can preferably be controlled individually and more preferably set to different pressures. Preferably, the pressure members are provided upstream from the location in which the cavities are filled.

The problem is also solved with a method to form a food product in a cavity of a mould drum, which is sealed by a seal plate, wherein the cavity is at least partially vented via the seal member or a gap between the seal member and the mould drum.

The disclosure made regarding the inventive food product forming apparatus also applies to the inventive method and vice versa. Subject matters disclosed in connection with the inventive apparatus can also be incorporated into claims referring to the inventive method.

This subject matter of the present patent application refers to a method to form a food product, for example a patty, from food mass, for example minces meat. The food mass is formed in a cavity, which is open on one side. The cavity is part of a mould drum.

Before, during and/or after the filling takes place, the open side of the cavity is at least partially sealed with a seal member, for example a seal plate.

According to the present invention, the cavity is vented before and/or during and/or after filling via the seal member and/or via gap between the seal member and the mould drum. The venting preferably takes place via a valve in the seal member. This valve can be a simple recess, that extends from the interface between the seal member and the mould drum until the ambient and/or a volume, which takes up the vented gas. The valve may comprise a movable body which can be actuated manually or automatically. In case that there is a multitude of cavities in one row, which are filled and emptied simultaneously, preferably each cavity comprises a recess/valve, which more preferably can be adjusted individually. In case the cavity is vented via a gap, the size of this gap is preferably controllable, so example by adjusting the pressure and/or the location at which the seal member, preferably a seal plate, is pressed against the mould drum. Preferably, the pressure between the seal member and the mould drum is released until the entrapped air escapes and is then increased again. According to another preferred embodiment of the present invention, the sealing between the seal member and the mould drum is self-adjusting, i.e. if the pressure of in the cavity exceeds a certain limit, a gap between the mould drum and the seal member establishes, via which the entrapped gas can escape. However, preferably this gap remains so small that only gas and no or very little food mass particle or food product liquid can escape from the cavity. As soon as the pressure decreases the gap reduces its size automatically. According to another preferred embodiment, there are means to mechanically and/or electrically and/or magnetically establish the gap between the seal- and the mould drum.

In case an actuatable valve is provided in the seal plate, it is preferably opened during and/or after filling of a cavity.

The venting of each cavity during and/or after filling is preferably a supplement to the venting of the cavities via a porous, gas permeable structure which is part of each cavity. However, the venting can also exclusively be executed via the seal member and/or a gap between the seal- and the mould drum.

BRIEF DESCRIPTION OF THE DRAWINGS

The inventions are now explained according to the Figures. Theses explanations do not limit the scope of protection. The explanations apply to all embodiments of the present invention likewise.

FIGS. 3-6 each depict an embodiment of the present invention.

FIG. 1 depicts a food forming apparatus 1 according FIG. 25 (FIG. 1a) and FIG. 28 (FIG. 1b) of WO2013014010. The mould member is a mould drum 6 rotating in counter-clockwise direction and provided at its circumference with a multitude of cavities 7. As can be seen, there are more than one cavity in one row, i.e. more than one cavity is filled and emptied simultaneously. These cavities comprising a bottom wall and a sidewall and are in this embodiment at least partially made from a porous structure. During filling air entrapped within the cavity and within the food mass will be removed through the porous structure of the cavities to the fluid passage 8 and from thereon to the ambient. Driving force for this is the pressurized mass flowing via mass supply 2 (food pump, not depicted) and food mass infeed channel 3 into the cavity. To prevent distortion of the formed food product a pressurized cutting member 10 is pressing against the seal plate or directly against the mould drum in the downstream area of the manifold.

Figure 1B:
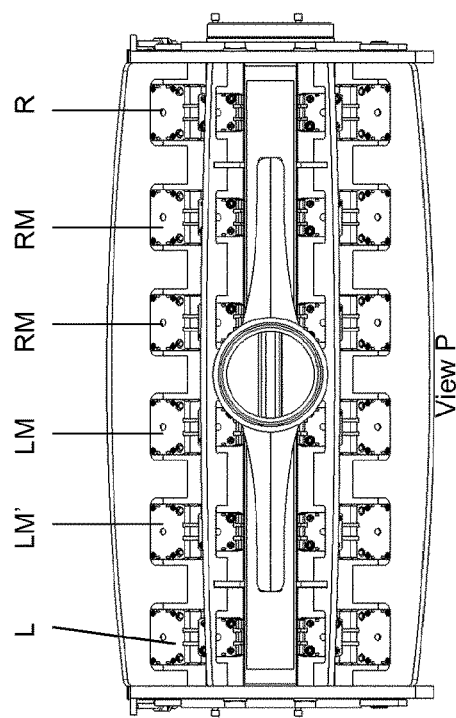
FIGS. 1 and 2 depict the state in the art.

Pressure means 12 and 13 are depicted as stabilization elements, more specifically as blocks, preferably plastic blocks, however these stabilization elements can be designed differently, for instance a bended plate as long as the design allows the stabilization elements to follow the deformation of the drum. Pressure elements 16 in row A and B in upstream sealing area 4 will press seal plate 9 via upstream stabilization element 12 and manifold 11 against the circumference of drum 6. Pressure elements 16 in row C and D in downstream sealing area 5 will press seal plate 9 via downstream stabilization element 13 and manifold 11 against the circumference of drum 6. The seal plate 9 is flexible and hence able to follow the irregularity of the surface of the drum and is in the upstream sealing area and the downstream area in sealing connection with the drum, so no air can escape to the ambient.

The pressure elements 16 are depicted as double-acting actuators more specifically as double-acting pneumatic cylinders whose piston is directly or via connecting elements 15 connected to the stabilization elements 12, 13. All pressure elements in one row can be pressurized individually with an individual pressure or with one and the same pressure. All rows can be pressurized with a unique pressure or with one and the same pressure. The outermost pressure elements L and R will prevent leakage of food mass beyond the outer ends of the drum. The number of pressure elements depends mainly on the length of the drum and/or the forces acting on the drum (pressure food mass, pressure of the pressure elements, weight drum) and/or the deformation of the drum versus the stiffness of the stabilization elements. The pressure elements are able to retract the manifold and stabilization elements to a position in which the food forming apparatus can be serviced, cleaned and for instance the seal plate can be exchanged.

Figure 2:
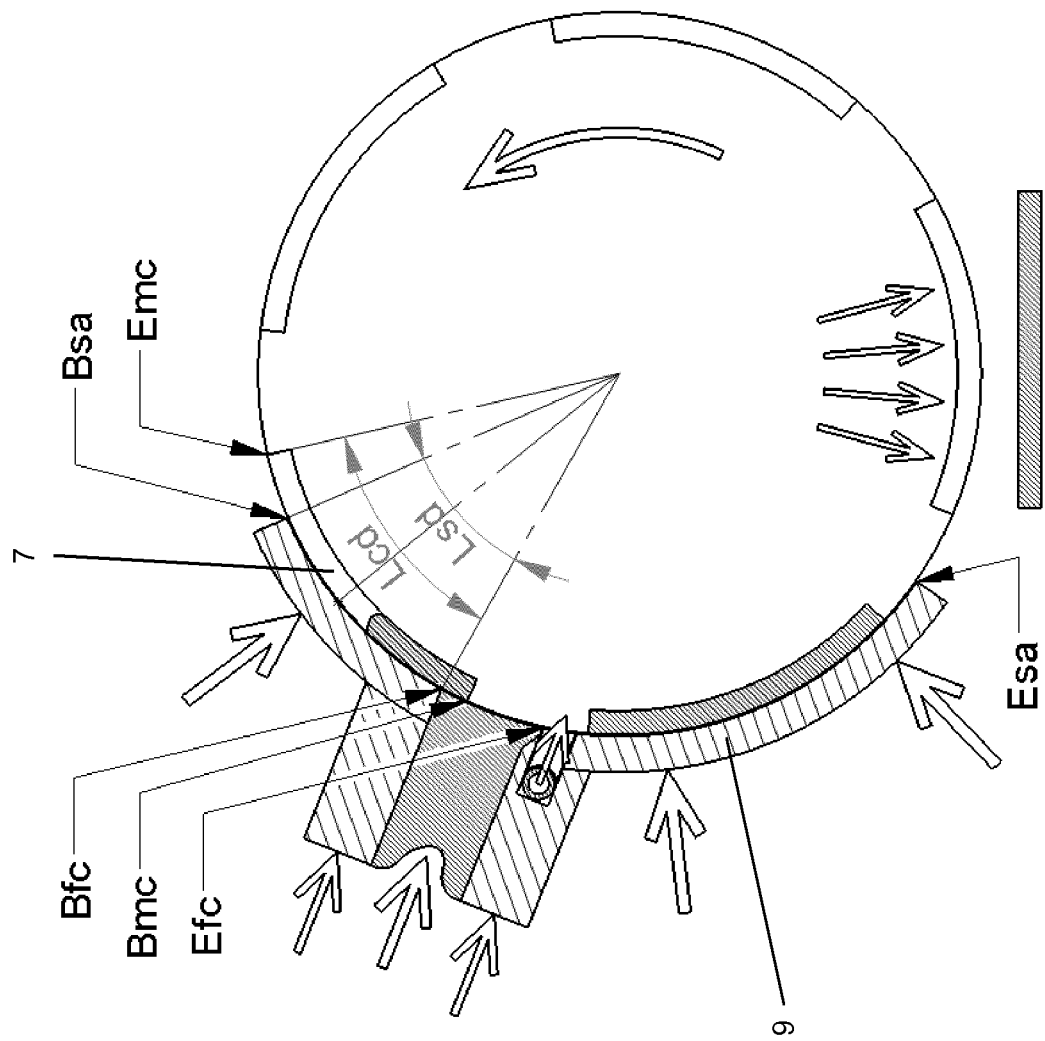

FIG. 2 depicts de-aeration of the cavity. The filling of the mould cavity will start as soon as, due to rotation of the mould drum, the down stream end of the mould cavity Bmc passes the upstream end of the channel Bfc and will stop as soon as the upstream end of a mould cavity Emc passes the down stream end of the feed channel Efc. Sealing between the seal member 9, here a seal plate, and the mould drum 6, here a mould drum, up stream from the filling slot, takes place between begin sealing area Bsa and begin feed channel Bfc. The sealing length Lsd in circumferential direction drum is here shorter than cavity length Lcd in circumferential direction drum.

Initially, during the filling of the cavity with pressurized food mass the mass will consequently force the entrapped air within the cavity, which is subjected to a lower pressure, to flow via opening Bsa-Emc to the ambient. During further rotation of the drum the cavity will be further filled with a volume of food mass. The remaining volume of entrapped air in the cavity will be compressed and forced over the decreasing distance Bsa-Emc to the ambient. De-aeration along the sealing will stop as soon as the distance Bsa-Emc is zero. In an embodiment with a cavity with an at least partly porous structure or other de-aeration means such as perforations and/or openings, additional de-aeration can take place via the de-aeration means of the cavity.

Taken into account the desired operating parameters such as fill pressure and rotational speed of the mould drum, the sealing length Lsd will be chosen such that the de-aeration to the ambient along the adapted sealing is sufficient and without any leakage of food mass to the ambient.

It has now been found that the design according to the state in the art may lead to only partially filled cavities.

Figure 3B:
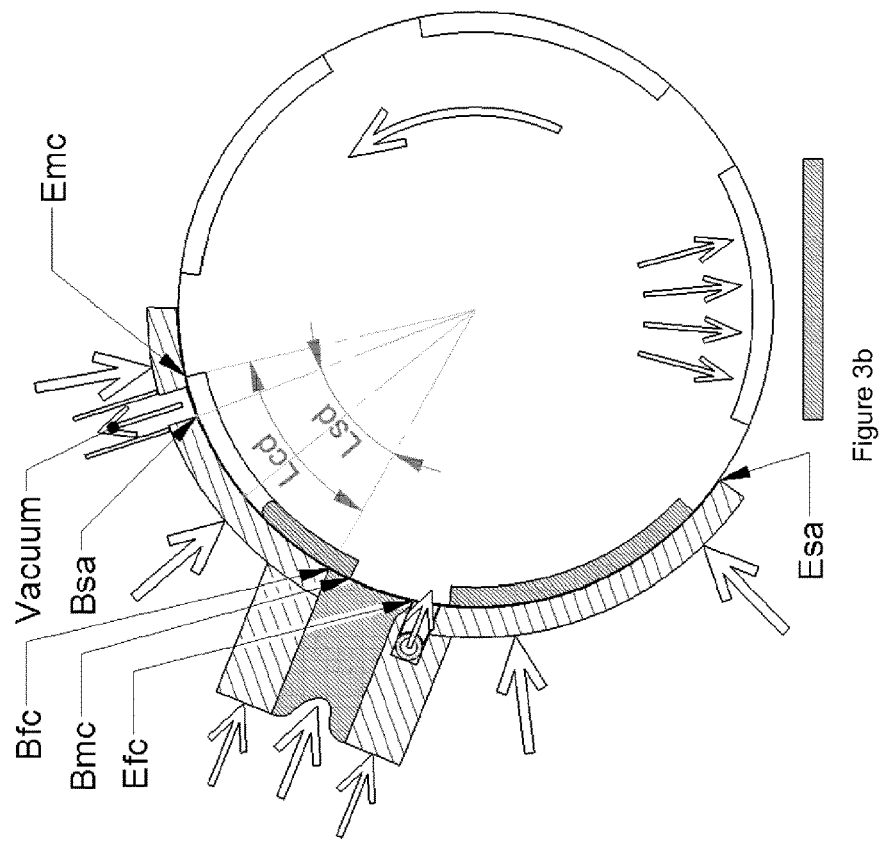
Figure 3A:
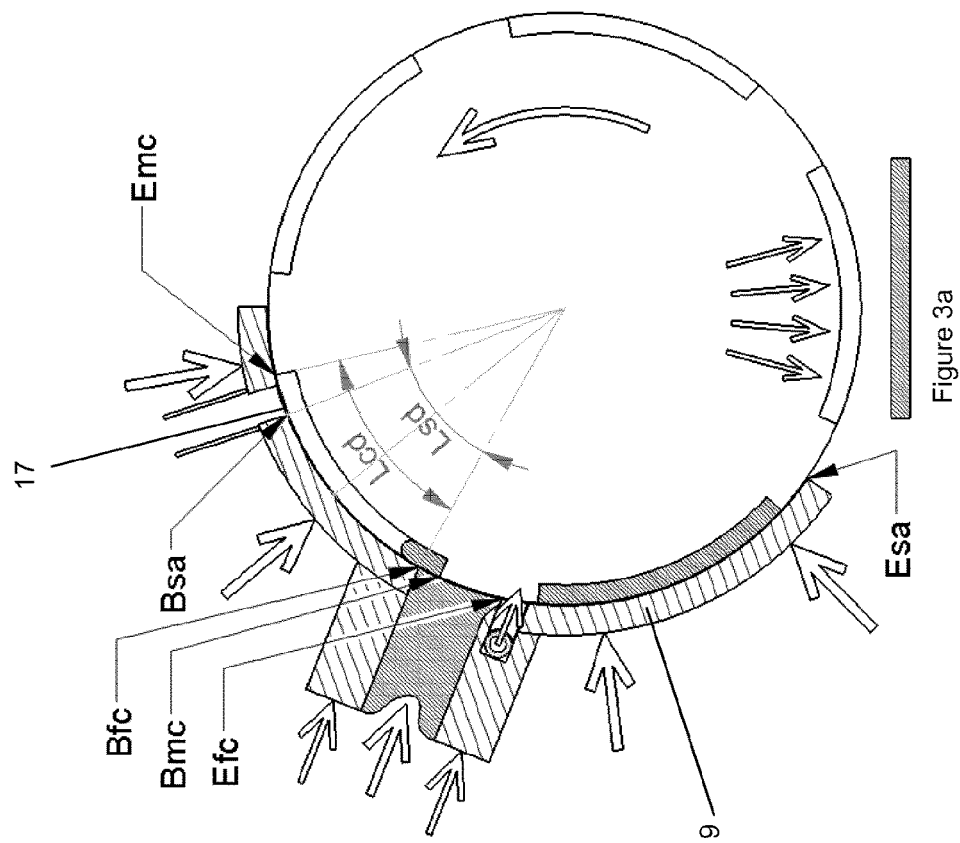

FIG. 3b depicts a first embodiment of the invention to remove entrapped air from the cavity via the seal member, here a seal plate 9. In the present case, vacuum is in fluid-connection with the cavity, not via the porous structure of the cavity but via recess 17 in sealing 9. The person skilled in the art understand, that it may be sufficient to connect the cavity via the seal plate to a pressure lower than the filling pressure, for example ambient pressure. In case mass properties and/or properties related to the cavity and/or process parameters will vary, vacuum parameters can be adjusted such that each cavity is entirely filled in combination with the correct weight and without leakage of mass via the vacuum connection. Preferably the vacuum parameters such as the level of vacuum and the timing (the instant that vacuum start and stops, duration) in which the vacuum connection is in contact with the cavity, will be determined within the control system, preferably automatically, such that no human action is needed. In case a connection to a vacuum source during production of the food forming apparatus is not required this embodiment can operate without vacuum and still de-aeration along the sealing and through recess 17 will take place as depicted in FIG. 3a. In case no de-aeration at all along the sealing is required recess 17 can be closed-off (not depicted). In case there is more than one cavity in one row, the vacuum applied to each cavity, can preferably controlled individually.

A second embodiment is depicted in FIG. 4a. Here, a valve 19 is provided to control and/or adjust the vent-gas flow from each cavity or a row of cavities. This valve can be actuated manually but is preferably operated by motorized drive means such that de-aeration of entrapped air within the cavity takes place during sealing of the cavities, through recess 17 and, for example via housing 18, to the ambient. FIG. 4b depicts the valve in a closed position such that no de-aeration from the cavity to the ambient can take place. There can be one valve per cavity in one row. However, there can be also less valves than cavities in one row. In the second case, there is preferably a manifold provided in the seal plate, which collects the vented gas and leads it to the valve and then for example to the ambient.

Figure 5A:
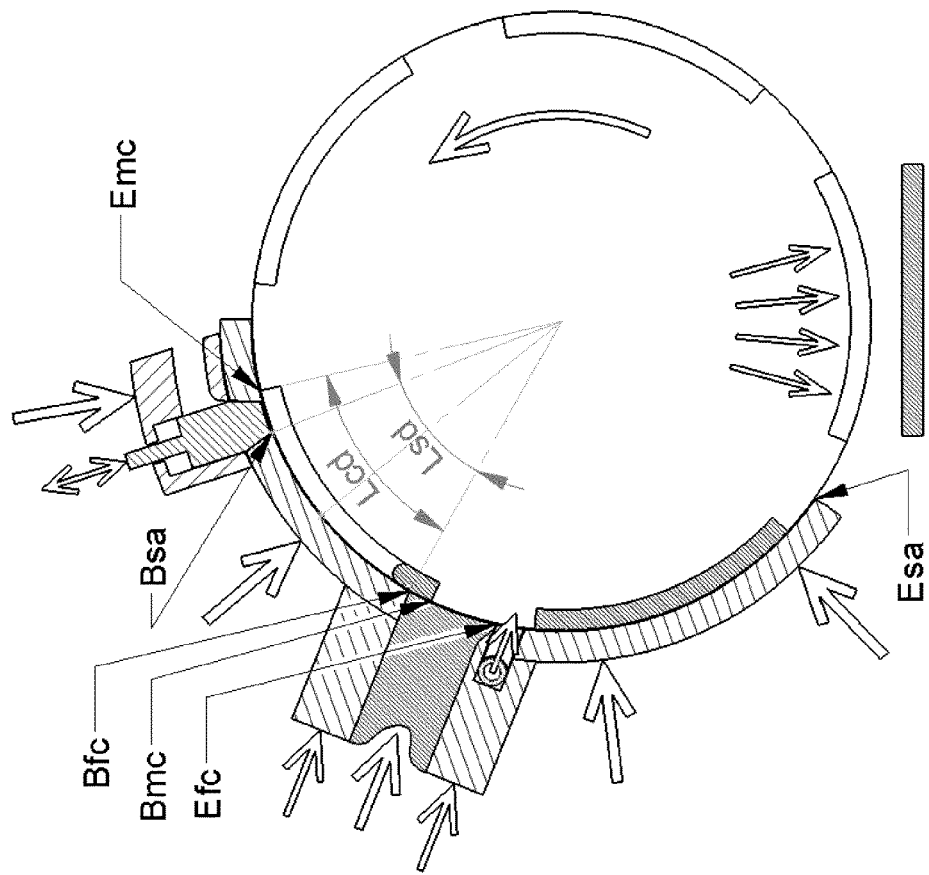
Figure 5B:
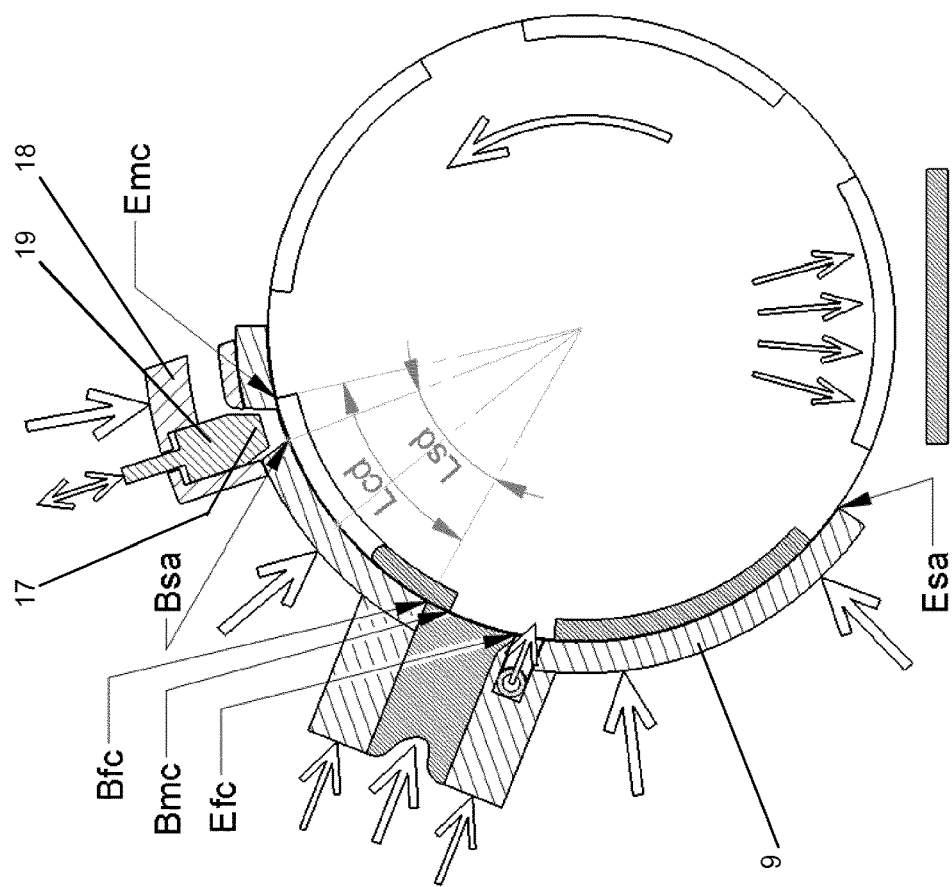

FIG. 5 depicts a third embodiment of the invention in which valve 19 will be displaced, here in valve housing 18, in radial direction with respect to the axis of rotation of the drum. The valve can be moved manually but preferably via drive means. FIG. 5b depicts the valve in a closed position.

FIG. 6 shows yet another embodiment of the present invention. In this case, the entire venting or the venting additionally to a venting via the cavity takes place by means of a gap 20 between the form- and the seal member 9.

Figure 1A:
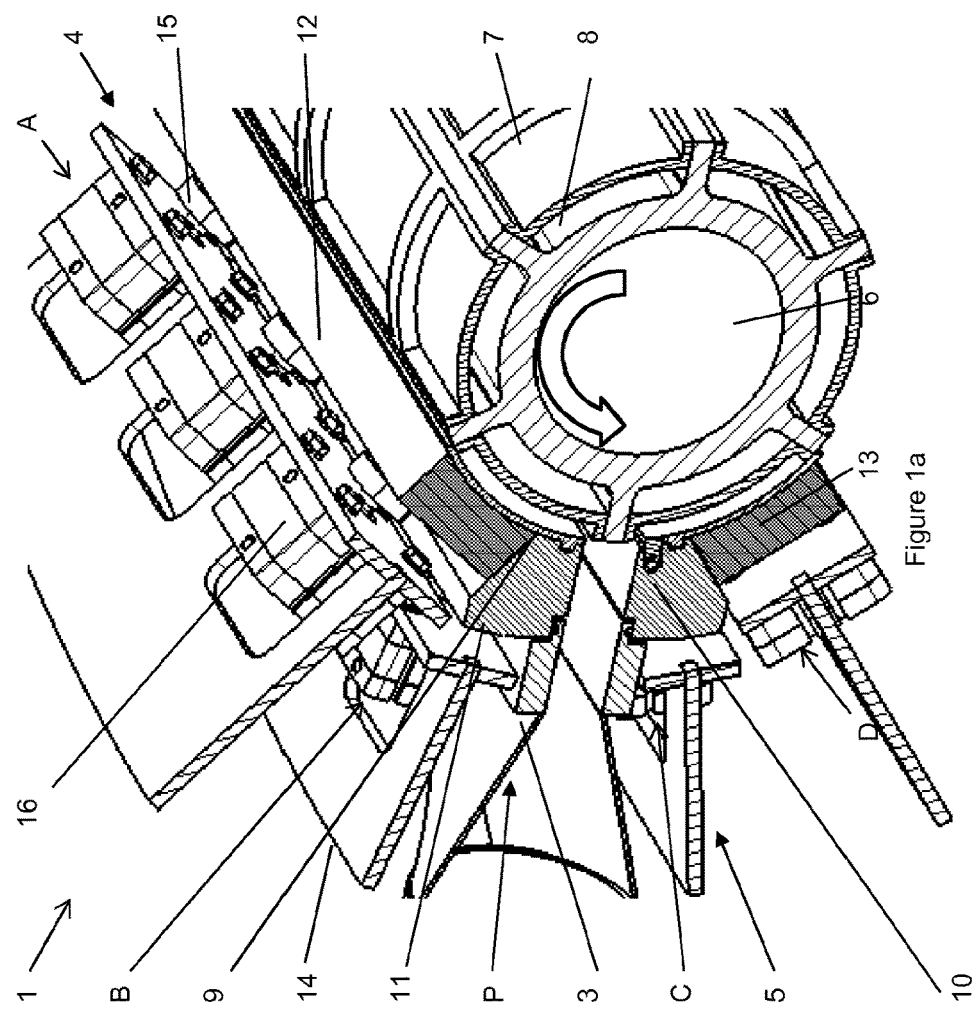

The size of the gap can, for example be controlled by the pressure means explained according to FIG. 1. In case no de-aeration of entrapped air via the gap 20 is needed, the seal plate in the upstream sealing area can be pressed over its entire length against the outer surface of the drum as depicted in FIG. 1. In cases, de-aeration along the seal plate is required, the relevant pressure elements in row A can be actuated such that before and/or during and/or after filling entrapped air within the cavity can escape via a shortcut from the specific cavity along the sealing and to the ambient. Therefore, the pressure elements will retract the pressure means and sealing away from the position of the drum resulting in deformation of the seal plate as depicted in FIG. 6 and/or their pressure is reduced such that the pressure of the air to entrap opens the gap.

Figure 6A:
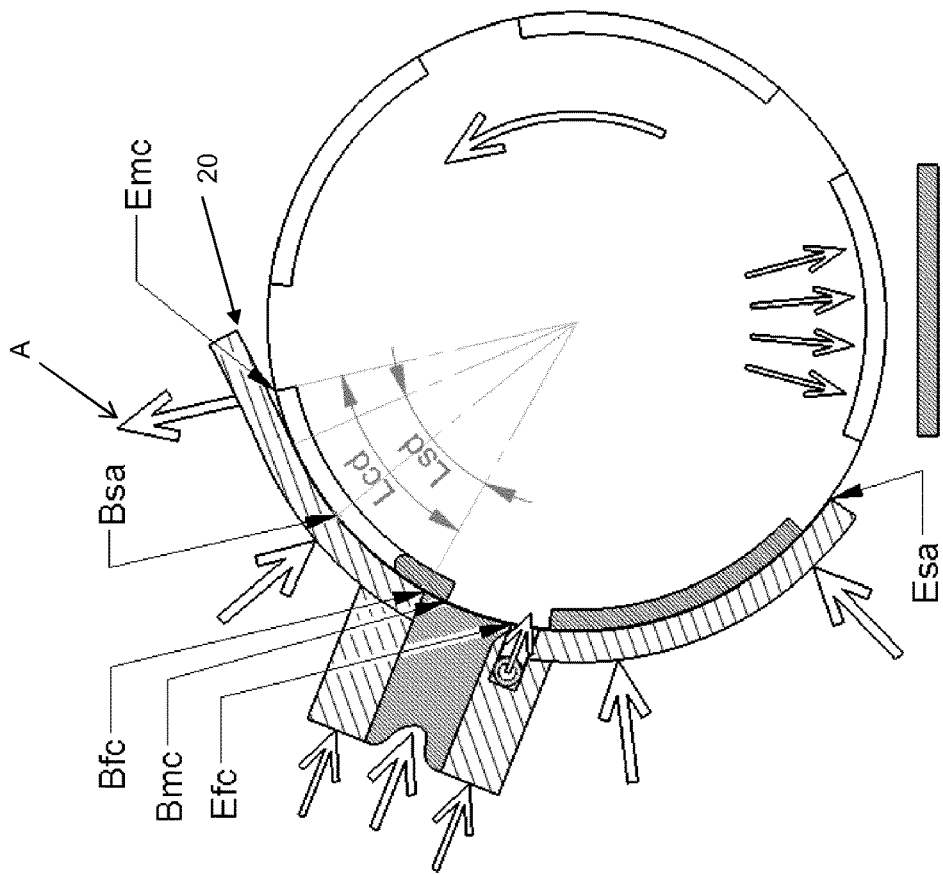
Figure 6B:
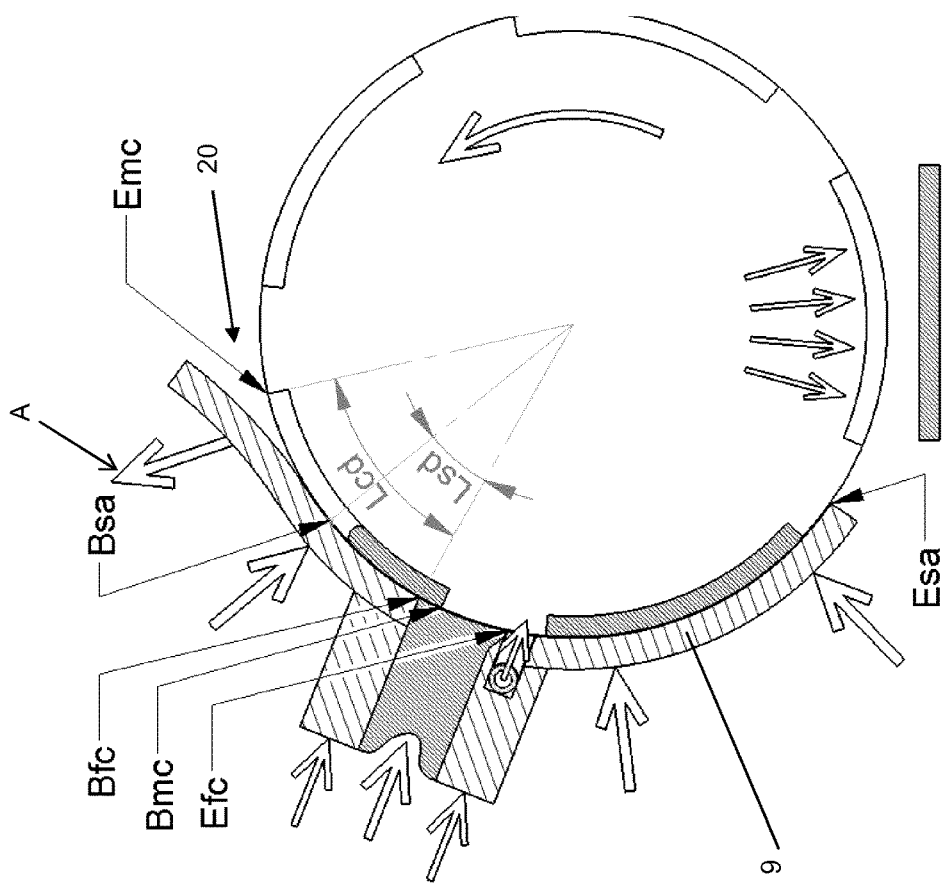

Based on the same forming apparatus, process parameters and same position of a cavity relative to the feed channel; in FIG. 6a the sealing is subjected to a high degree of deformation resulting in a substantial filled cavity contrary with FIG. 6b in which the seal plate is deformed only slightly.

The pressure elements 16 used in row A-D and specifically used in row A can be configured as a mechanism driven by a motor. In another embodiment, the pressure elements are separate inflatable bellows or cylinders in order to press the pressure means and sealing against the circumference of the drum and further separate pressure elements to retract the pressure means and sealing away from the drum. Preferably the pressure elements are double-acting actuators more specifically double-acting pneumatic cylinders which pistons are directly connected to pressure means such as the stabilization element 12 or indirectly via connecting elements 15. Pressure means 12 will preferably be connected to the seal plate.

In order to achieve a stable system and/or stable process, the drive mechanisms to drive the valve in the embodiment according to FIGS. 4 and 5 and/or to vary the degree of deformation of the seal plate in the embodiment according to FIG. 6 are preferably automatically controlled by a control unit which is part of the forming apparatus such that no manual intervention is needed during production, even if the mass properties and/or properties related to a cavity and/or process parameters will vary during production. The valve and/or the size of the gap may be pressure controlled and/or controlled depending on the rotational position of the drum, for example the position of a cavity relative to the filling slot and/or the seal member.

In case de-aeration via a cavity will be combined with additional de-aeration means such as described in inventive embodiments, the pressure on the food mass can be reduced. Less force on the food mass will result in less damage of the composition/structure of the mass during transportation from the mass supply system to the cavity. Further it will prevent clogging of the porous structure and/or openings in the cavity.

For all described embodiments, de-aeration along and/or through the sealing can already start before the downstream end of the mould cavity Bmc passes upstream end of the feed channel Bfc, thus before filling of the cavity actually starts.

Beside the described embodiments, a combination of embodiments such as a cavity with a porous structure connected to the ambient, vacuum connected to a cavity via the sealing, sealing provided with a valve, retractable sealing, etcetera can be used. Embodiments of inventions described in combination with a mould drum may also be used in combination with a mould plate.

LIST OF REFERENCE SIGNS 1 food product forming apparatus
2 mass supply
3 food mass infeed channel
4 upstream sealing area 5 downstream sealing area
6 food forming member, drum, mould drum
7 product cavity
8 fluid passage
9 seal member, seal plate
10 cutting member
11 manifold
12 upstream stabilization element
13 downstream stabilization element
14 frame
15 connecting element, piston
16 pressure element, actuator, cylinder
17 Recess
18 Valve housing
19 Valve
20 gap between seal plate 9 and mould drum 6
A-D row numbers
L-R individual pressure elements left-right
Bsa begin sealing area
Esa end sealing area
Bfc begin feed channel
Efc end feed channel
Bmc begin mould cavity seen in rotational direction drum
Emc end mould cavity seen in rotational direction drum
Lcd cavity length in circumferential direction mould drum
Lsd sealing length in upstream sealing area mould drum

The invention claimed is:

1. A food product forming apparatus comprising:
a mould drum comprising a multitude of product cavities, each of the multitude of product cavities comprise a bottom wall and a sidewall made of a porous material;
an infeed channel 1 mass is supplied to the mould drum;
a fluid passage, which extends in a longitudinal direction of the mould drum;
a pair of stabilization blocks, one of which is arranged upstream of the infeed channel and a second of which is arranged downstream of the infeed channel;
a seal plate;
one or more piston/cylinder arrangements that are arranged above each of the pair of stabilization blocks and that are controlled and configured to press the pair of stabilization blocks against the seal plate to cause the seal plate to be moved relative to a surface of the mould drum to change a size of a gap that is defined between the seal plate and the surface of the mould drum during filling of the multitude of product cavities with the food mass; and
a controller configured to control the one or more piston/cylinder arrangements to change the size of the gap;
wherein during the filling of the multitude of product cavities, entrapped air within one or more of the multitude of product cavities is removed therefrom through the porous material, the fluid passage, and the gap.

2. The food product forming apparatus according to claim 1, wherein the food product forming apparatus comprises a valve.

3. The food product forming apparatus according to claim 1, wherein the gap between the mould drum and the seal plate is defined only at an upstream end of the multitude of product cavities while the seal plate is in contact with the surface of the mould drum at a downstream end of the multitude of product cavities.

4. The food product forming apparatus according to claim 1, wherein the controller is configured to create the gap between the seal plate and the surface of the mould drum by releasing pressure acting on the seal plate and the controller is configured to close the gap between the seal plate and the surface of the mould drum by increasing the pressure acting the seal plate.

5. The food forming member according to one claim 1, wherein the multitude of product cavities are at a circumference of the mould drum.

6. The food product forming apparatus according to claim 4, wherein the pressure between the seal plate and the surface of the mould drum is released until entrapped the air escapes through the gap.

7. The food product forming apparatus according to claim 2, wherein the food product forming apparatus comprises a valve in the seal plate that is controlled by the controller to open during and/or after the filling of the multitude of product cavities.

8. The food product forming apparatus according to claim 1,
wherein when a pressure in one or the multitude of product cavities exceeds a certain pressure limit, then the controller is configured to create the gap between the surface of the mould drum and the seal plate through which the entrapped air gas can escape; and
wherein after the pressure in the one or the multitude of product cavities falls below another pressure limit, then the controller is configured to reduce the size of the gap or close the gap.

9. The food product forming apparatus according to claim 1, wherein the gap exists before, while, or after one or the multitude of product cavities are filled.

10. A food product forming apparatus comprising:
a mould drum comprising a multitude of product cavities, each of the multitude of product cavities comprise a bottom wall and a sidewall made of a porous material;
an infeed channel through which food mass is supplied to the mould drum;
a fluid passage, which extends in a longitudinal direction of the mould drum;
a pair of stabilization elements, one of which is arranged upstream of the infeed channel and a second of which is arranged downstream of the infeed channel,
a seal plate, which sealingly cooperates with a surface of the mould drum to define a gap between the seal plate and the surface of the mould drum;
one or more inflatable bellows that are configured to apply pressure on the pair of stabilization elements to press the stabilization elements against the seal plate to cause the seal plate to move towards the surface of the mould drum to reduce a size of the gap or to close the gap during filling of the multitude of product cavities, and the one or more inflatable bellows are configured to reduce the pressure acting on the pair of stabilization elements to reduce the pressure on the seal plate to increase the size of the gap during filling of the multitude of product cavities;
a controller configured to control the one or more inflatable bellows to increase the pressure on the pair of stabilization elements to close the gap during filling of the multitude of product cavities, and then the controller is configured to control the one or more inflatable bellows to reduce the pressure acting on the pair of stabilization elements to create or increase the size of the gap during the filling of the multitude of product cavities.

11. The food product forming apparatus according to claim 10, wherein the seal member comprises an upstream end and an opposing downstream end, the upstream end is deformed and deflected away from the surface of the mould drum when the pressure is applied on the seal plate by the one or more inflatable bellows, while the downstream end of the seal member remains pressed against the surface of the mould drum.

* * * * *

UNITED STATES PATENT AND TRADEMARK OFFICE
CERTIFICATE OF CORRECTION

PATENT NO. : 12,108,769 B2
APPLICATION NO. : 16/603462
DATED : October 8, 2024
INVENTOR(S) : Hendrikus Petrus Gerardus Van Gerwen et al.

Page 1 of 1

It is certified that error appears in the above-identified patent and that said Letters Patent is hereby corrected as shown below:

In the Claims

Column 7, Line 32, delete "an infeed channel 1 mass is supplied to the mould drum" and insert --an infeed channel through which food mass is supplied to the mould drum--

Column 8, Line 9, delete "entrapped the air" and insert --the entrapped air--

Column 8, Line 22, delete "air gas can escape;" and insert --air can escape;--

Signed and Sealed this
Fourteenth Day of January, 2025

Derrick Brent
*Acting Director of the United States Patent and Trademark Office*